July 25, 1944.  D. R. LIGH ET AL  2,354,467
UNIVERSAL JOINT
Filed April 2, 1943  3 Sheets-Sheet 1
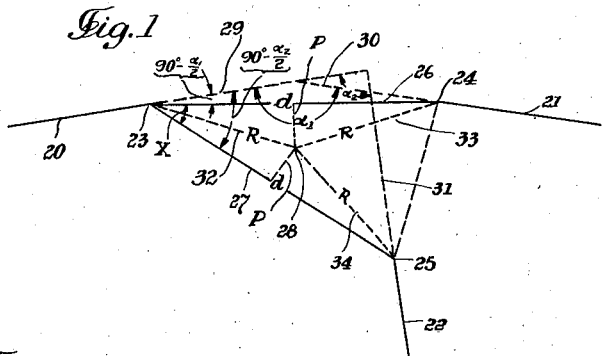
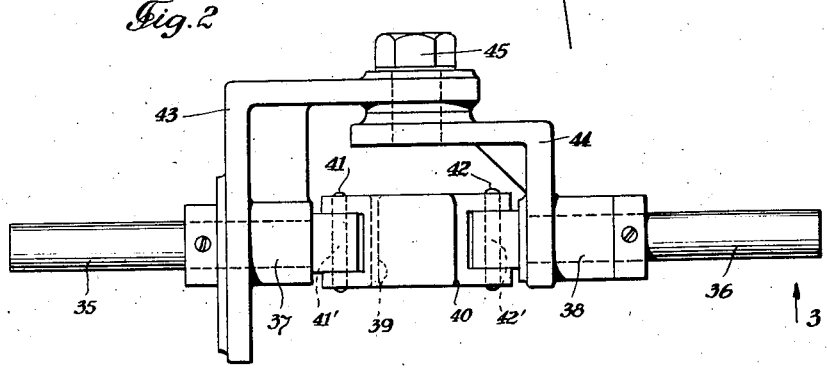
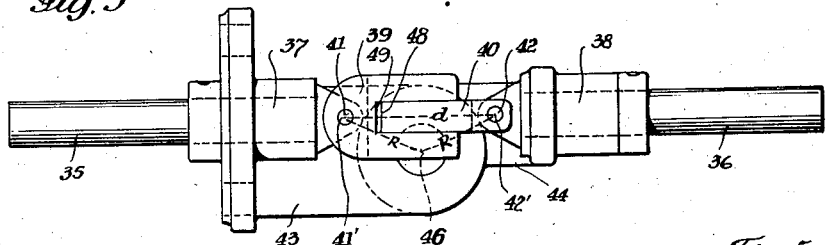
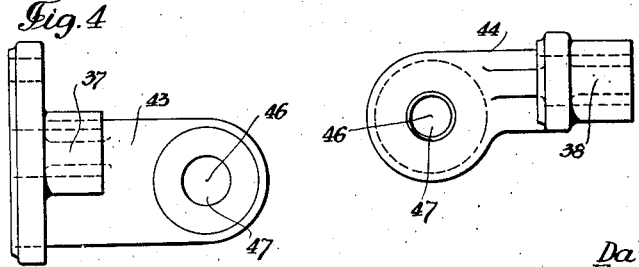
INVENTORS:
David R. Ligh and
Franz F. Ehrenhaft
BY
their agent July 25, 1944. D. R. LIGH ET AL 2,354,467
UNIVERSAL JOINT
Filed April 2, 1943 3 Sheets-Sheet 2

INVENTORS:
David R. Ligh and
Franz F. Ehrenhaft
BY
their agent

July 25, 1944.   D. R. LIGH ET AL   2,354,467
UNIVERSAL JOINT
Filed April 2, 1943   3 Sheets-Sheet 3
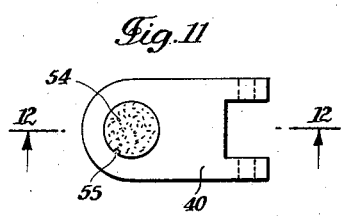
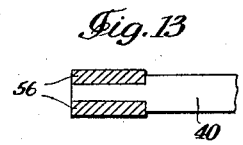
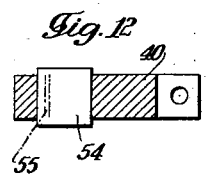
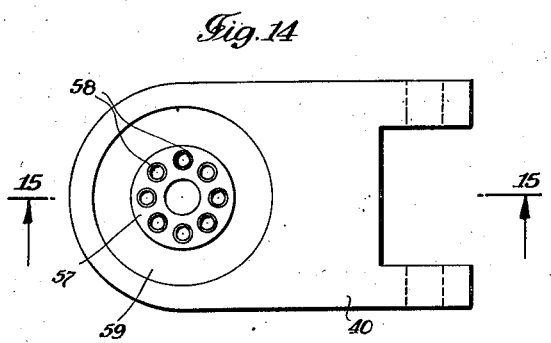
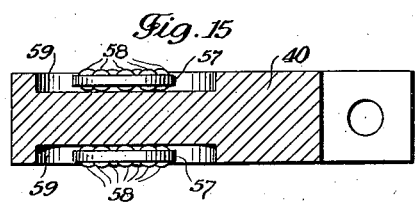
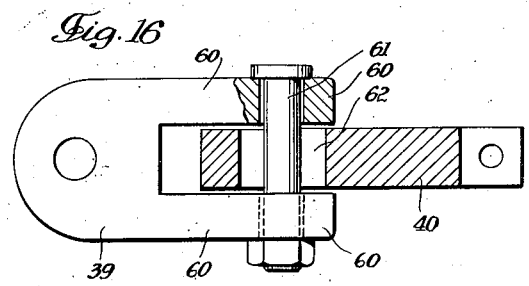
INVENTORS:
David R. Ligh and
Franz F. Ehrenhaft
BY Patented July 25, 1944

2,354,467

UNITED STATES PATENT OFFICE 2,354,467

UNIVERSAL JOINT

David R. Ligh, New Dorp, and Franz F. Ehrenhaft, Forest Hills, N. Y., assignors to Darli Industrial Management, Incorporated, Hartford, Conn., a corporation of Connecticut Application April 2, 1943, Serial No. 481,540

12 Claims. (Cl. 64—21)

The present invention relates to universal joints adapted to transmit rotary motions between two shaft ends and more particularly to universal joints transmitting this rotary motion in such a manner that the rate of angular velocity of the driving and the driven shaft shall be the same at all angles.

It is an object of the present invention to provide a universal joint of extremely simple construction which nevertheless is reliable in operation.

It is a further object of the present invention to provide a universal joint of small size and compact construction.

Still a further object of the present invention consists of a universal joint built in such a manner that the space required for the joint members during tilting of the shafts relative to each other is always substantially the same.

With the above objects in view, the new universal joint comprises two shafts and a rotation transmitting member attached to the end of each of these shafts turnably about an axis which is perpendicular to the corresponding shaft axis and intersecting the same, thereby forming an intersecting point between each of these axes and the corresponding shaft axis; these two rotation transmitting members are slidably interconnected so as to enable rotation of one shaft by rotating the other; the new joint furthermore includes separate bearings supporting these shafts and means connecting these bearings and the shafts supported by the same turnably about a pivoting axis; in accordance with the present invention, these connecting means are constructed in such a manner that the pivoting axis of these connecting means is positioned so that the bearings and the supported shafts are turnable between two predetermined positions in which the distances between the intersecting points mentioned above—namely between the points at which the shaft axes intersect the axes of the rotation transmitting members—are equal to each other. It is easy to understand that by constructing the connecting means in the way defined above the space needed for the joint is substantially reduced as in both positions the rotation transmitting members will be substantially in the same position relative to each other.

We have found that for the purposes of the present invention it is preferable to construct and arrange the bearings and the means connecting the same so that in the predetermined positions of the shafts in which the angle enclosed by the same differs by a predetermined tilting angle $\alpha$, the pivoting axis about which the bearings and the shafts supported by the same are tilted is from each of the intersecting points mentioned above at a distance equal to about $$\frac{d}{2 \cos \frac{\alpha}{4}}$$

wherein $d$ represents the distance between the intersecting points in one of these predetermined positions. By constructing the universal joint in the above described way, i. e. by providing connecting means for the bearings which fulfill the above condition, the object of the present invention is fully attained, namely the intersecting points of the shafts with the axes of the rotation transmitting members are at the same distance from each other in both predetermined positions, thereby also ensuring identical relative position of these rotation transmitting members in these positions.

By computing the above formula for a tilting angle of $\alpha$ equal to 90°, we have found that the distance between each of the intersecting points and the pivoting axis has to be about 541 thousandths of the distance between the intersecting points in one of the predetermined positions, while in case of a tilting angle of 45° this distance has to equal about 509 thousandths of the distance between the intersecting points. It is evident that for purposes of computation the distance between the intersecting points in one of these positions will have to be a predetermined value and that the position of the pivoting axis will then be determined on this basis; of course, the result of this determination will show that the distance of the pivoting axis from the intersecting points is the same also if the joint is in the other of the predetermined positions. Thus, the distance of each intersecting point from the pivoting axis is equal in both predetermined positions.

We have furthermore found that universal joints of the above type, namely universal joints provided with rotation transmitting members having plane parallel surfaces engaging each other during rotation, can be further improved if as provided by the present invention always the same portions of these engaging surfaces face each other, i. e. if these engaging surfaces are always substantially in the same relative position to each other. In this case, it is possible to combine with or to arrange within these engaging surfaces self-lubricating devices making repeated lubrication during operation of the joint unnecessary. It is also possible to combine with universal joints of the type proposed herewith means for reducing friction between the engaging surfaces, for instance ball bearings or the like. Such improvements are of particular importance in cases where the joint is not entirely enclosed in a casing. However, it should be repeated that all these improvements are only possible in universal joints of the type proposed herewith, namely in universal joints in which the distance between the intersecting points of the pivoting axes and shafts is always substantially constant during tilting of these shafts relative to each other.

The novel features which we consider characteristic for our invention are set forth in particular in the appended claims. The invention itself, however, both as to its construction and its method of operation, together with additional objects and advantages thereof, will be best understood from the following description of specific embodiments, when read in connection with the accompanying drawings in which:

Fig. 1 is a diagrammatic explanation of the new universal joint;

Fig. 2 is a side view of an embodiment of the new universal joint;

Fig. 3 is a view of the joint shown in Fig. 2, seen in direction of arrow 3;

Figure 6:
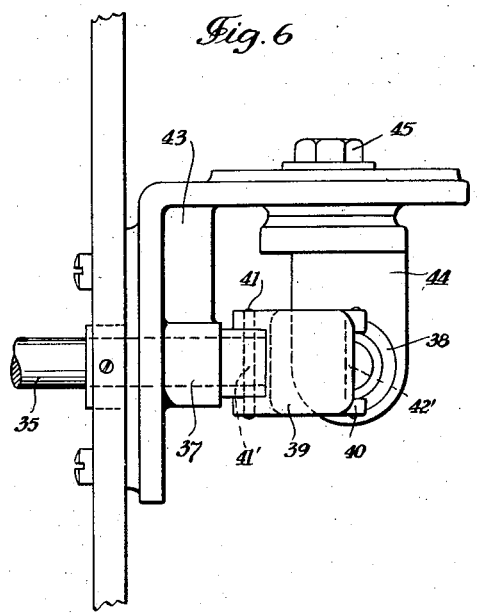
Figure 7:
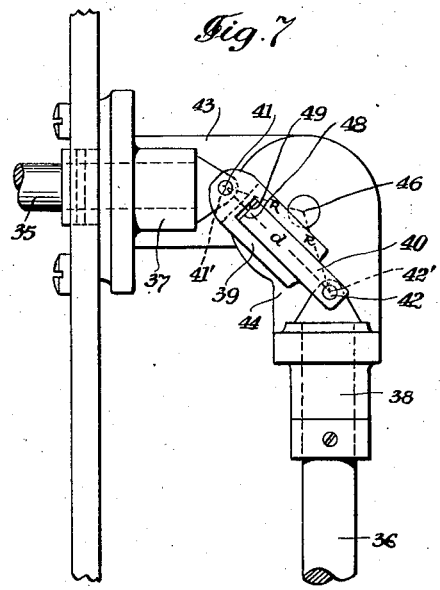
Figure 9:
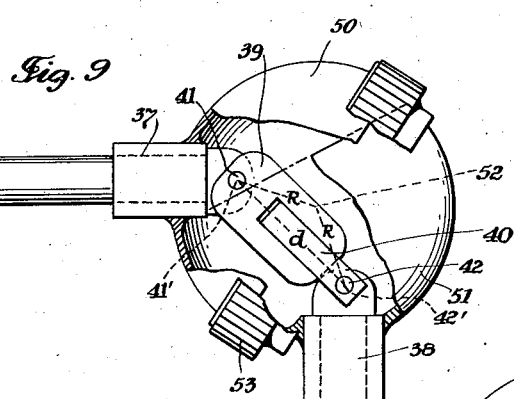
Figure 8:
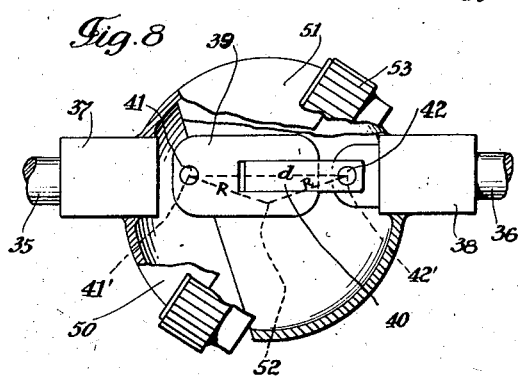

Figs. 4 and 5 are views of the bearings and the bearing connecting means shown in Figs. 2 and 3, seen in direction of arrow 3;

Figs. 6 and 7 are side and bottom views of the universal joint shown in Figs. 2 and 3 after tilting the shafts about 90° relative to each other;

Fig. 8 is a modification of the universal joint shown in Figs. 2 to 7 partly in section, with the shaft axes in alignment;

Fig. 9 is a view of the universal joint shown in Fig. 8 partly in section, with the shaft axes forming an angle of 90°.

Figure 10:
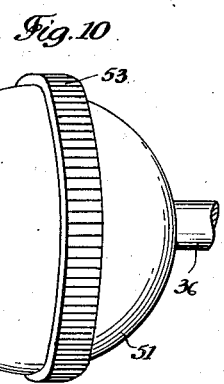

Figure 10 is a perspective view of the universal joint shown in Figs. 8 and 9;

Figs. 11 and 12 are a side view and a cross section, respectively, of a rotation transmitting member provided with a self-lubricating device;

Fig. 13 is a cross section of a modified lubricating device;

Figs. 14 and 15 are a side view and section, respectively, of a rotation transmitting member provided with ball bearings; and Fig. 16 is a top view, partly in section, of an adjusting device for the rotation transmitting members.

As explained above, the distance $d$ between the intersecting points of the shafts and axes of the rotation transmitting members has to be the same in two predetermined positions, preferably the end positions of the joint differing from each other by the tilting angle $\alpha$; for obtaining this object, the means connecting the bearings supporting the shafts have to be constructed and arranged in such a manner that the pivoting axis is in both these end positions at a distance equal to $$\frac{d}{2 \cos \frac{\alpha}{4}}$$

from the intersecting points.

This can easily be proved by referring to the diagrammatic Fig. 1. In this figure, line 20 indicates one shaft the position of which, for purposes of simplification, is kept constant during tilting of the joint; numeral 21 indicates the second shaft in one end position while numeral 22 indicates this shaft in the other end position. Numeral 23 indicates the intersecting point between shaft 20 and the axis of one of the rotation transmitting members, while numerals 24 and 25 indicate the position of the second intersecting point—namely the intersecting point between shaft 21 and the axis of the other rotation transmitting member—in the two end positions of the joint. 26 and 27 indicate the position of the two rotation transmitting members in both end positions; from what has been set forth above it is clear that according to the present invention these distances 26 and 27, i. e. the distances $d$ have to be equal to each other, i. e. that the points 24 and 25 have to be equally distant from point 23.

Before further proceeding with computation of the distance of the pivotal axis indicated by numeral 28 from these intersecting points 23 and 24, 25 respectively, the value of angle $x$ has to be determined. By drawing the auxiliary lines 29, 30 forming the angle $\alpha_1$ enclosed by the shafts in one end position and by drawing the additional auxiliary line 31 which with line 29 forms the angle $\alpha_2$ enclosed by the shafts in the other end position, it can easily be found that angle $x$ is equal to $$\frac{\alpha^1 - \alpha^2}{2}$$

In view of the fact that $\alpha_1 - \alpha_2$ is equal to the tiling angle $\alpha$, the angle $x$ is equal to $$\frac{\alpha}{2}$$

i. e. equal to half of the tilting angle $\alpha$.

Proceeding now further with computation of the sought distance of the pivotal axis 28 from the intersecting points 23 and 24, 25 respectively and taking into account that for purposes of proper functioning of the joint these distances have to be equal to each other, it will be found that the pivotal axis 28 has to be located in the center of the circle circumscribed about the triangle formed by points 23, 24, and 25. Thus each of the distances 32, 33, and 34, i. e. of the distances R has to be equal to $$\frac{d}{2 \cos \frac{x}{2}}$$

i. e. has to be further equal to $$\frac{d}{2 \cos \frac{\alpha}{4}}$$

Therefore, if one predetermined, e. g. end position of the shafts is known, for instance the position defined by lines 20, 26, and 21, and it is furthermore known that the tilting angle in the other end position differs from that in the known one by a tilting angle $\alpha$, then the connecting means between the bearings have to be constructed in such a manner that during adjustment of the universal joint the bearings are turned about a pivotal axis being from points 23 and 24 at a distance equal to $$\frac{d}{2 \cos \frac{\alpha}{4}}$$

wherein $d$ stands for the distance between points 23 and 24.

In some cases, it is desired to define the position of the pivoting axis by its distance from the lines connecting the intersecting points, i. e. by the distances P shown in Figure 1. In order to determine these distances P, it has to be considered that as well-known $$P^2 + \left(\frac{d}{2}\right)^2$$

is equal to R². Since R as found above is equal to $$\frac{d}{2 \cos \frac{\alpha}{4}}$$

it is evident that $$P^2 = \frac{d^2}{4 \cos^2 \frac{\alpha}{4}} - \frac{d^2}{4} = \frac{d^2}{4 \cos^2 \frac{\alpha}{4}} - \frac{d^2 \cos^2 \frac{\alpha}{4}}{4 \cos^2 \frac{\alpha}{4}} =$$

$$d^2 \frac{\left(1 - \cos^2 \frac{\alpha}{4}\right)}{4 \cos^2 \frac{\alpha}{4}} = \frac{d^2 \sin^2 \frac{\alpha}{4}}{4 \cos^2 \frac{\alpha}{4}} = \frac{d^2}{4} \tan^2 \frac{\alpha}{4}$$

It follows from this that $$P = \sqrt{\frac{d^2}{4} \tan^2 \frac{\alpha}{4}}$$

which is furthermore equal to $$\frac{d}{2} \tan \frac{\alpha}{4}$$

Figures 2 to 7 show one embodiment of a universal joint built for a tilting angle of α=90° in accordance with the present invention as set forth above. The shafts 35 and 36 are supported by bearings 37 and 38 and the rotation transmitting members 39 and 40 are pivotally secured by means of pivots 41 and 42 to the ends of these shafts 35 and 36 respectively. The axes of these pivots 41 and 42 cross the axes of the shafts 35 and 36 at intersecting points designated in the drawings with 41' and 42' respectively. Each of the rotation transmitting members 39 and 40 is provided with oppositely facing plane parallel surfaces engaging mating surfaces of the other member slidable relative to this other member in any direction parallel to such surfaces. It is evident and does not need any further explanation that rotation of one member will cause rotation of the other member and thus by rotating one of the shafts 35 and 36 the other shaft can be rotated.

The bearings 37 and 38 are connected by brackets 43 and 44; each of these brackets is built together with the corresponding bearing. These brackets 43 and 44 on their part are turnably connected with each other by means of a screw 45. This screw is firmly screwed into bracket 44 while bracket 43 is provided with a hole enabling free turning of this bracket about the screw. Brackets 43 and 44 are adjusted while screw 45 is loose and then secured in the required relative position to each other by tightening this screw.

In all known universal joints of the above described type the connecting means—namely the brackets 43 and 44—are arranged in such a manner that the pivotal axis, i. e. the axis of screw 45, crosses the axis of the rotation transmitting members in one of the end positions. Contrary thereto, this pivotal axis, namely the axis of screw 45, is arranged in accordance with the present invention as shown in Figure 3, i. e. at a certain distance from the common axis of rotation transmitting members 39 and 40. The exact position of this pivotal axis is determined as explained above: namely the distance R of this axis 45 from each of the intersecting points 41' and 42' has to be equal to $$\frac{d}{2 \cos \frac{90°}{4}}$$

wherein d represents the distance between the pivotal points 41' and 42'. As $$\cos \frac{90°}{4}$$

is equal to cos 22° 30' which is further equal to .923880, $$\frac{d}{2 \cos \frac{90°}{4}}$$

is equal to 541 thousandths of d. This means that the distance R between the pivotal axis 46 and the intersecting points 41' and 42' respectively is equal to 541 thousandths of the distance d between the intersecting points 41' and 42'.

Figures 4 and 5 show the connecting brackets 43 and 44 constructed in the above explained way. It is clearly visible from these figures that the pivotal axis 46, i. e. the axis of screw hole 47, lies outside of the axes of shafts 35 and 36, and thus does not lie in the common axis of the rotation transmitting members 39 and 40 either. The exact distance of this pivotal axis 46 from the shaft axes and the common axis of the rotation transmitting members has to be determined as explained above.

Figures 6 and 7 show the universal joint shown in Figs. 2 and 3 in the other end position, tilted by an angle of 90°. It may be noticed from this figure that the distance d between the intersecting points 41' and 42' remains substantially equal and that thus also the relative position of the rotation transmitting members 39 and 40 in both end positions is substantially identical. In view of the fact that during movement from one end position to the other the intersecting points 41' and 42' move a little farther from each other—but never nearer to each other than in these end positions—it is possible to compute the connecting means under the assumption that in the end positions the intersecting points 41' and 42' are nearest to each other, i. e. to let the front face 48 of member 40 almost touch the corresponding face 49 of member 39 in the end positions.

Figures 8 to 10 show a modification of our above described universal joint based on the same principle. Shafts 35 and 36, bearings 37 and 38, and the rotation transmitting members 39 and 40 are identical in construction to the corresponding parts of the embodiment shown in Figs. 2 to 7. The only difference lies in the construction of the bearing connecting members which in this embodiment have the shape of semi-spherical cups 50 and 51 entirely enclosing the rotation transmitting parts of the joint. These semi-spherical cups form one piece with the bearings; thus, the relative position of these bearings is adjusted by varying the relative positions of the two cups to each other and securing them in the required position by means of pressure ring 53. As shown in the drawings, the center 52 of the sphere formed by the two semi-spherical cups 50 and 51 which determines the pivotal axis about which the bearings are turned is not located within and does not cross the axes of shafts 35 and 36. This center 52 and the pivotal axis passing through the same are arranged in the same way as the axis of screw 45 in the embodiment shown in Figs. 2 to 7. Thus, by this construction, the same result might be obtained as by that described above in detail.

It should be noted that this spherical casing construction has certain operative advantages compared to the bracket construction. These advantages consist mainly in complete enclosure of the rotation transmitting parts of the joint, protecting these parts from dust and injury, and easy simple lubrication of these parts.

Lubrication of the bracket type joint shown in Figures 2 to 7 is more difficult. We have found that this difficulty can be overcome by providing in the plane parallel engaging surfaces of the rotation transmitting members lubricating or other friction reducing means. As shown in Figs. 11 and 12, these lubricating means might consist in a cylindrical member 54 made of felt and arranged in a corresponding hole 55 in one of the rotation transmitting members, e. g. in member 40. This cylindrical felt member is saturated with a lubricant, thereby assuring due lubrication of the engaging surfaces for practically unlimited time. Instead of arranging a felt member in the above described way, it is also possible to secure to the surface of rotation transmitting member 40 porous metallic plates 56 saturated with a lubricating substance, e. g. oilite or the like, in the manner shown in Figure 13.

Instead of lubricating means, ball bearings can also be used for reducing the friction between the engaging surfaces of the rotation transmitting members. Thus, for instance, as shown in Figures 14 and 15, the ring cages 57 of thrust bearings together with the bearing balls 58 can be arranged in depressions 59; these depressions have to be wider than the ring cages in order to enable free movement of the bearing balls 58 during rotation of the members 39 and 40 relative to each other.

In order to avoid bending of the tongue-like projections 60 of member 39 during operation of the joint, it is sometimes advisable to connect these projections, as shown in Fig. 16, by a screw 61 passing through a hole 62 in member 40. This hole has to be considerably larger than the cross section of screw 61 in order to enable free movement of members 39 and 40 relative to each other.

We wish to stress that we have found also other ways to attain the objects of the present invention, namely to ensure that the distance between the intersecting points of the shafts and the rotation transmitting members remain substantially or entirely constant during tilting of the shafts relative to each other. Thus, for instance, it is possible to construct and arrange the members connecting the bearings in a way different from that proposed above and to compensate the variation of distance between the intersecting points by making one or both of the shafts adjustable in axial direction.

This axial adjustability can be obtained in various ways as for instance by making one or both of the shafts adjustable relative to the corresponding bearing or bearings, or by making one or both bearings adjustable relative to the corresponding connecting member or members. It is also possible to make the connection between the members connecting the bearings adjustable, for instance in axial direction of one or both of the shafts, obtaining thereby the same results as by axially adjustable shafts or bearings.

It is evident that the adjustment of the rotation transmitting members relative to each other, as described in the two preceding paragraphs, is not automatic, that is to say that after each tilting of the shafts relative to each other the relative position of the rotation transmitting members has to be adjusted separately. This disadvantage can be overcome by use of specific automatic adjusting means causing automatic adjustment of the adjustable joint members relative to each other during tilting of the shafts; these automatic adjusting means have to work in such a manner that the relative position of the rotation transmitting members remains unchanged during tilting, thereby ensuring the same relative position of these members in every possible position of the joint.

We have found that such automatic adjustment can be obtained with relative ease if the connection between the members connecting the bearings is made adjustable. In this case, a simple automatic adjusting device for obtaining the purpose of the present invention consists in providing each of the connecting members with a slot and a pin; each of these pins has to cooperate with and slide in the slot of the other member; these slots have to be arranged and curved in such a manner as to compel the intersecting points between the shafts and the rotation transmitting members to move during tilting of these connecting members relative to each other in such a manner that their distance remains constant during this tilting movement. Of course, these pins may be combined and form part of screws by which these connecting members are secured to each other so that for tilting of the joint it is only necessary to loosen these screws, to slide each of them in the corresponding slot of the other member until the joint is tilted into the desired position, and then to tighten the screws in this position. If the slots are correctly curved, the intersecting points of the shafts and rotation transmitting members will remain during tilting and in the final tilted position at the same distance from each other as in the initial position before tilting of the joint.

It will be understood that each of the elements described above, or two or more together, may also find a useful application in other types of shaft connecting means differing from the types described above.

While we have illustrated and described the invention as embodied in universal joints, we do not intend to be limited to the details shown, since various modifications and structural changes may be made without departing in any way from the spirit of our invention.

Without further analysis, the foregoing will so fully reveal the gist of our invention that others can, by applying current knowledge, readily adapt it for various applications without omitting features that, from the standpoint of prior art, fairly constitute essential characteristics of the generic or specific aspects of this invention and therefore such adaptations should and are intended to be comprehended within the meaning and range of equivalence of the following claims.

What we claim as new and desire to secure by Letters Patent is:

1. Universal joint comprising two shafts, a rotation transmitting member attached turnably to each of said shafts at the end thereof, said two rotation transmitting turnable members being slidably interconnected so as to enable rotation of one of said shafts by rotating the other shaft, separate bearings supporting each of said shafts, and means connecting said bearings and the shafts supported by the same turnably about a pivoting axis spaced from the axes of said shafts.

2. Universal joint comprising two shafts having intersecting axes, a rotation transmitting member attached to each of said shafts at the end thereof turnably about an axis being perpendicular to the corresponding shaft axis and intersecting the same, said two rotation transmitting members being slidably interconnected so as to enable rotation of one of said shafts by rotating the other shaft, separate bearings supporting each of said shafts, and means connecting said bearings and the shafts supported by the same turnably about a pivoting axis being perpendicular to the plane defined by said shafts and being spaced from the intersection of said shaft axes.

3. Universal joint comprising two shafts, a rotation transmitting member attached to each of said shafts at the end thereof turnably about an axis being perpendicular to the corresponding shaft axis and intersecting the same, thereby forming an intersecting point between each of said axes and the corresponding shaft axes, said two rotation transmitting members being slidably interconnected so as to enable rotation of one of said shafts by rotating the other shaft, separate bearings supporting each of said shafts, and means connecting said bearings and the shafts supported by the same turnably between two positions differing from each other by a tilting angle $\alpha$ about a pivoting axis being offset from said shaft axes in such a manner that in said two positions of said shafts the distance of said pivoting axis from the line connecting said intersecting points is at least substantially equal to about $$\frac{d}{2}\tan\frac{\alpha}{4}$$

wherein $d$ represents the distance between said intersecting points in one of said positions.

4. Universal joint comprising two shafts having intersecting axes, a rotation transmitting member attached to each of said shafts at the end thereof turnably about an axis being perpendicular to the corresponding shaft axis and intersecting the same, thereby forming an intersecting point between each of said axes and the two corresponding shaft axes, said two rotation transmitting members being slidably interconnected so as to enable rotation of one of said shafts by rotating the other shaft, separate bearings supporting each of said shafts, and means connecting said bearings and the shafts supported by the same turnably between two positions differing from each other by a tilting angle $\alpha$ about a pivoting axis being perpendicular to the plane defined by said shaft axes and being offset from the intersection of said shaft axes in such a manner that in said two positions of said shafts the distance of said pivoting axis from the line connecting said intersecting points is at least substantially equal to about $$\frac{d}{2}\tan\frac{\alpha}{4}$$

wherein $d$ represents the distance between said intersecting points in one of said positions.

5. Universal joint comprising two shafts having intersecting axes, a rotation transmitting member attached to each of said shafts at the end thereof turnably about an axis being perpendicular to the corresponding shaft axis and intersecting the same, thereby forming an intersecting point between each of said axes and the corresponding shaft axis, said two rotation transmitting members being slidably interconnected so as to enable rotation of one of said shafts by rotating the other shaft, separate bearings supporting each of said shafts, and means connecting said bearings and the shafts supported by the same turnably between two different angular positions about a pivoting axis being offset from the intersection of said shaft axes in such a manner that in said different angular positions the distance of said pivoting axis from the line connecting said intersecting points is at least substantially equal.

6. Universal joint comprising two shafts having intersecting axes, a rotation transmitting member attached to each of said shafts at the end thereof turnably about an axis being perpendicular to the corresponding shaft axis and intersecting the same, thereby forming an intersecting point between each of said axes and the corresponding shaft axis, said two rotation transmitting members being slidably interconnected so as to enable rotation of one of said shafts by rotating the other shaft, separate bearings supporting each of said shafts, and means connecting said bearings and the shafts supported by the same turnably between two different angular positions about a pivoting axis being at an equal distance from said intersecting points and being offset from the intersecton of said shaft axes in such a manner that in said different angular positions the distance of said pivoting axis from the line connecting said intersecting points is at least substantially equal.

7. Universal joint comprising two shafts, a rotation transmitting member attached to each of said shafts at the end thereof turnably about an axis being perpendicular to the corresponding shaft axis and intersecting the same, thereby forming an intersecting point between each of said axes and the corresponding shaft axis, said two rotation transmitting members being slidably interconnected so as to enable rotation of one of said shafts by rotating the other shaft, separate bearings supporting each of said shafts, and means connecting said bearings and the shafts supported by the same turnably between two different angular positions about a pivoting axis being at equal distance from said intersecting points and perpendicular to the plane defined by said shafts and offset from said shaft axes in such a manner that in said different angular positions the distance of said pivoting axis from the line connecting said intersecting points is at least substantially equal.

8. Universal joint comprising two shafts, a rotation transmitting member attached to each of said shafts at the end thereof turnably about an axis being perpendicular to the corresponding shaft axis and intersecting the same, thereby forming an intersecting point between each of said axes and the corresponding shaft axis, said two rotation transmitting members being slidably interconnected so as to enable rotation of one of said shafts by rotating the other shaft, separate bearings supporting each of said shafts, and means connecting said bearings and the shafts supported by the same turnably between two different angular positions about a pivoting axis being at equal distance from said intersecting points and offset from said shaft axes.

9. Universal joint comprising two shafts, a rotation transmitting member attached to each of said shafts at the end thereof turnably about an axis being perpendicular to the corresponding shaft axis and intersecting the same, thereby forming an intersecting point between each of said axes and the corresponding shaft axis, said two rotation transmitting members being slidably interconnected so as to enable rotation of one of said shafts by rotating the other shaft, separate bearings supporting each of said shafts, and means connecting said bearings and the shafts supported by the same turnably between two different angular positions about a pivoting axis being at equal distance from said intersecting points and perpendicular to the plane defined by said shafts and offset from said shaft axes.

10. Universal joint comprising two shafts having intersecting axes, a rotation transmitting member attached to each of said shafts at the end thereof turnably about an axis being perpendicular to the corresponding shaft axis and intersecting the same, thereby forming an intersecting point between each of said axes and the corresponding shaft axis, said two rotation transmitting members being slidably interconnected so as to enable rotation of one of said shafts by rotating the other shaft, separate bearings supporting each of said shafts, and means connecting said bearings and the shafts supported by the same turnably between two different angular positions about a pivoting axis being at an equal distance from said intersecting points and being offset from the intersection of said shaft axes.

11. Universal joint comprising two shafts having intersecting axes, a rotation transmitting member attached to each of said shafts at the end thereof turnably about an axis being perpendicular to the corresponding shaft axis and intersecting the same, thereby forming an intersecting point between each of said axes and the corresponding shaft axis, said two rotation transmitting members being slidably interconnected so as to enable rotation of one of said shafts by rotating the other shaft, separate bearings supporting each of said shafts, and means connecting said bearings and the shafts supported by the same turnably between two different angular positions about a pivoting axis being at an equal distance from said intersecting points and perpendicular to the plane defined by said shaft axes and offset from the intersection of said shaft axes.

12. Universal joint comprising two shafts having intersecting axes, a rotation transmitting member attached to each of said shafts at the end thereof turnably about an axis being perpendicular to the corresponding shaft axis and intersecting the same, thereby forming an intersecting point between each of said axes and the corresponding shaft axes, said two rotation transmitting members being slidably interconnected so as to enable rotation of one of said shafts by rotating the other shaft, separate bearings supporting each of said shafts, and means connecting said bearings and the shafts supported by the same turnably between two positions differing from each other by a tilting angle $\alpha$ about a pivoting axis being perpendicular to the plane defined by said shaft axes and at equal distance from said intersecting points and offset from the intersection of said shaft axes in such a manner that in said two positions of said shafts the distance of said pivoting axis from the line connecting said intersecting points is at least substantially equal to about $$\frac{d}{2} \tan \frac{\alpha}{4}$$

wherein $d$ represents the distance between said intersecting points in one of said positions.

DAVID R. LIGH.
FRANZ F. EHRENHAFT.